United States Patent [19]

Hickman

[11] 4,355,838
[45] Oct. 26, 1982

[54] MOTORCYCLE FAIRING

[76] Inventor: John S. Hickman, 4149 N. Stowell Ave., Milwaukee, Wis. 53211

[21] Appl. No.: 148,420

[22] Filed: May 9, 1980

[51] Int. Cl.³ .............................................. B62J 17/04
[52] U.S. Cl. ................................ 296/78.1; 15/250 R
[58] Field of Search ............................... 296/78.1, 91; 280/289 R; 403/104, 363, 377; 15/250, 250.3

[56] References Cited

U.S. PATENT DOCUMENTS 4,066,291  1/1978  Hickman ........................... 296/78.1

FOREIGN PATENT DOCUMENTS 2629731  5/1978  Fed. Rep. of Germany ..... 296/78.1
365603  1/1932  United Kingdom ............... 15/250.3

Primary Examiner—Robert R. Song
Attorney, Agent, or Firm—Merriam, Marshall & Bicknell

[57] ABSTRACT

A motorcycle fairing with improved safety and operational features including a long-throw, strengthened adjustable windscreen, an electrical wiper motor and wiper assembly attached directly to the adjustable windscreen and cornering lights operated by both the turn signals and independent switch means. The adjustable windscreen has a pair of female members fixed to the windscreen and a pair of male track members fixed to the fairing. In assembly, the female members are connected to the male track members and slide along the track members to a desired position. Release means associated with the male and female members serve to lock the windscreen in a selected position. The windshield wiper motor and/or wiper arm and blade are attached to the adjustable windscreen and move up and down with the windscreen. Cornering lights mounted on fairing side faces are operated by both the motorcycle's turn signals and an independent switch mounted on the fairing.

7 Claims, 8 Drawing Figures

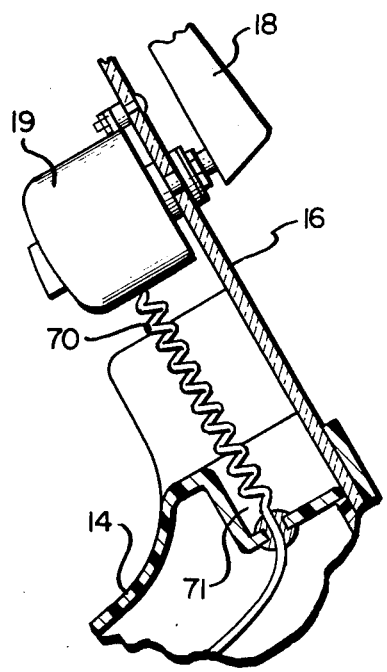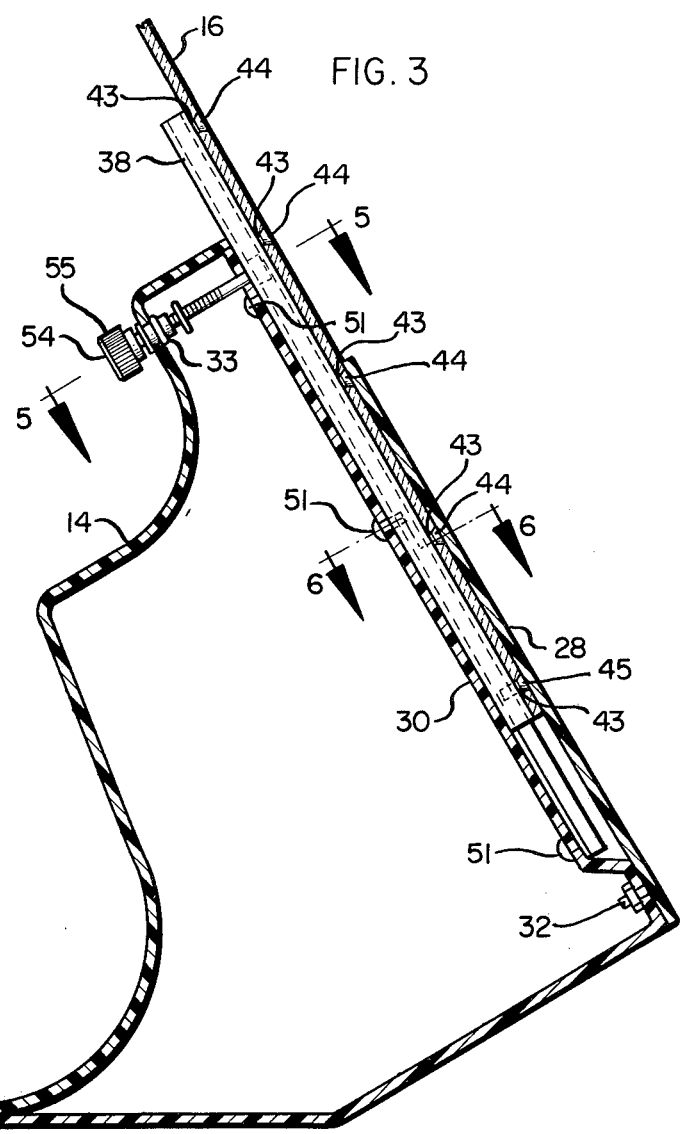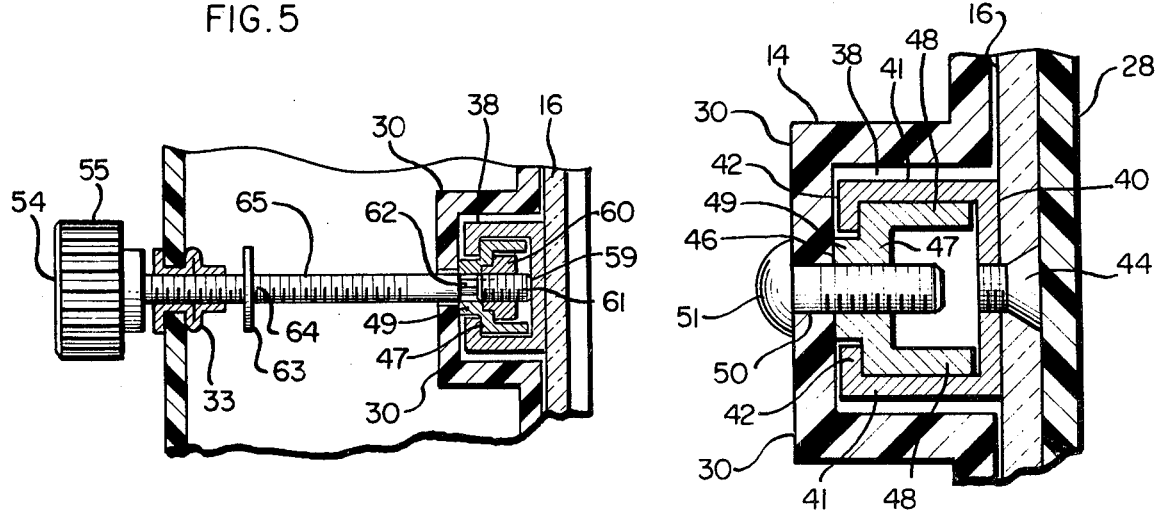

MOTORCYCLE FAIRING

This invention pertains to a motorcycle fairing with a new and improved adjustable windscreen, a wiper assembly attached to said windscreen, and cornering lights mounted in fore and aft planes on both sides of the fairing.

BACKGROUND OF THE INVENTION

My earlier patent, U.S. Pat. No. 4,066,291 issued Jan. 3, 1978, discloses an adjustable windscreen which, during inclimate weather, can be raised to above eye level, to permit a rider to look through a washed and wiped windscreen. During fair weather, the windscreen can be lowered to allow a rider to look over the windscreen, thereby eliminating reflected glare in the crucial field of vision. While the windscreen shown and disclosed in my U.S. Pat. No. 4,066,291 has been satisfactory for some purposes, it has been found that certain advantages are still desired.

Initially, it is desired to reduce the number of openings or slots in the windscreen itself to obviate the passage or leakage of water through an opening or slot in the windscreen itself. Heretofore, the solution shown in U.S. Pat. No. 4,066,291 has been closure plates or shield means which covered both the raised and lowered slots in the windscreen to eliminate the leakage of water. The use of a cover plate over the slot or opening has not been entirely satisfactory. The cover plate serves to detract from the overall streamlined effect or cosmetic appearance of the windscreen unit, due to the necessary upward extension of the cover plate to prevent passage of water through the raised windscreen slots. Additionally, as the length of the adjustment is increased the upward extension of all or portions of the cover plate interferes with road vision even when the windscreen itself is fully lowered during fair weather riding. Further, a cover plate extending upward to cover raised windscreen slots or apertures interferes with the operation of the wiper blade, causing damage thereto as it rides up and over the raised edges of the cover plate or face cover.

What is desired is an adjustable windscreen assembly which can be readily raised or lowered to the desired height level. It is also desired to reduce the number of open slots or holes in the windscreen or to eliminate them altogether to obviate leakage problems during inclimate weather. Further, it is desired to eliminate any need for upwardly extending cover plates and the like heretofore employed for covering slots or openings located in the windscreen and which interfere with wiper blade movement.

It is also desired to provide means for strengthening and stiffening the windscreen when it is in an elevated portion to permit reductions in windscreen thickness and weight and, when desired, cope with the extra loads imposed by the wiper assembly attached to the windscreen.

In my earlier U.S. Pat. No. 4,066,291, at least one hole or vertical slot was located in the windscreen. The surface of the screen slot forming the bottom portion of the slot served as a stop and prevented one from raising the windscreen too high. A slot stop was also provided: to prevent overstressing of the windscreen caused by raising it too high; to obviate theft of the windscreen; and, to keep the slotted opening in the windscreen behind the shield means or face cover adjacent the front windscreen face. It is desired to provide a new and improved means aside from the slot and slot stop system previously employed for keeping the windscreen from being raised too high. Further, it is desired to eliminate overstressing of parts caused by excessive raising of the windscreen and to provide means for precluding the theft of the screen from the fairing which occurs in some instances.

Another problem has been found to exist when the wiper motor is fixedly attached to a mounting plate or directly to the fairing and the wiper motor shaft extends through a slot in the windscreen. It has been ascertained that this mounting arrangement is unsatisfactory particularly when the windscreen length is increased which occurs when the windscreen is in a raised position. When the ratio of raised windscreen height to width increases substantially, it is difficult to simultaneously reach high enough with the wiper blade and maintain the wiper blade on the windscreen during its normal 110 degree downward stroke. It has been found the blade sometimes runs off the edge of the windscreen on the downstroke because the windscreen is too narrow for its height. Further, when the new long-throw windscreen of the present invention is in the down position and a rider inadvertently turns on the wiper, the wiper blade sometimes flops over and catches on the top edge of the windscreen, causing an undesired load on the wiper motor. It is desired to eliminate this problem of the wiper blade running off the side edge of the windscreen on a normal downstroke or off the top edge of the windscreen when the windscreen is in the down position.

Another problem associated with some fairings has to do with the headlight when mounted on a frame attached fairing. If a rider makes a sharp turn, the light on the fairing does not turn with the handlebar and wheel and, as a result, the rider has a moment or so when adequate light to see the road is not available until the fairing is aligned with the handlebar and wheel. What is desired is to have means to correct for this deficiency.

SUMMARY OF THE INVENTION

The invention disclosed and claimed herein serves to minimize the problems associated with prior art fairings, and releasably attached windscreens and wiper assemblies attached thereto. Further, it provides new features sought for frame attached fairing lights, releasably adjustable windscreens and wiper motor assemblies.

Briefly, the invention includes the provision of a fairing member adapted to receive a windscreen which is adjustable relative to the fairing. The windscreen is provided with a slotted female extrusion member. A male extrusion member is fastened to the motorcycle fairing and the female member is disposed on and adapted to travel along the male extrusion member until the desired windscreen height is achieved. The stop means of the present invention prevents the windscreen from being raised too high and also serves to prevent windscreen theft in that the windscreen cannot be readily removed from the fairing.

The utilization of the elongated extrusion members along the substantial length of the windscreen assists in providing the desired stiffening of the windscreen particularly when the windscreen is in an elevated position.

Means are also provided for windscreen breakaway which can occur, for example, during a crash when a rider can be forced forward into the windscreen.

The extrusion members, by eliminating the windscreen slots and holes, also allow for reduced size and improved appearance of the face cover required to seal the bottom edge of the windscreen against passage of water, particularly when the windscreen is in the fully raised position.

Additionally, the windscreen is provided with a wiper motor, arm and blade for wiping the windscreen regardless of the location of the windscreen relative to the fairing. Mounting of the wiper motor, arm and blade directly onto the releasably adjustable windscreen eliminates interference with the face cover. Further the load on the wiper motor is reduced by reducing the wiper blade arm length, and the wiper can function safely and adequately whether the windscreen is in a raised, lowered or intermediate height position. Additionally, when the windscreen is in the fully raised position, the wiper blade is provided with an additional uncluttered sweep arc over the windscreen area because the pivot point of the wiper arm is raised with the rise of the windscreen.

Cornering lights have been added to sideways facing areas provided on the present fairing invention's turn signal/running light structure. The cornering lights are activated by the turn signals in a manner identical or similar to those found on automobiles presently available. Additionally, the lights can be activated by a fairing mounted switch when the rider wishes to see to the left and right over rough ground. The newly added cornering lights of the present invention are mounted on the sideways facing planes of the turn signal/running light structures of the fairing. The light arrangement of the present invention permits a rider to see obstacles in the direction of his turn.

These and other features and advantages of the invention will become apparent to those having ordinary skill in the art with reference to the drawings, description and appended claims.

DESCRIPTION OF THE DRAWINGS

FIG. 1 also shows one of the sideways-facing cornering lights;

FIG. 3 shows a fragmentary, section view taken along lines 3—3 in FIG. 2 with the windscreen disposed within a fairing shell;

FIG. 4 shows a fragmentary, section view of the windscreen wiper motor assembly disposed on the back face of the windscreen and spirally wound electrical connection wires connected to the motor and extending through an opening in a recess formed in the fairing shell;

FIG. 5 shows a fragmentary, section view taken along lines 5—5 in FIG. 3 showing a release means for locking the windscreen height adjusting means;

FIG. 6 shows a fragmentary, section view taken along lines 6—6 in FIG. 3 showing the mounting of the male and female extrusion members to the fairing and windscreen;

DETAILED DESCRIPTION

Figure 1:
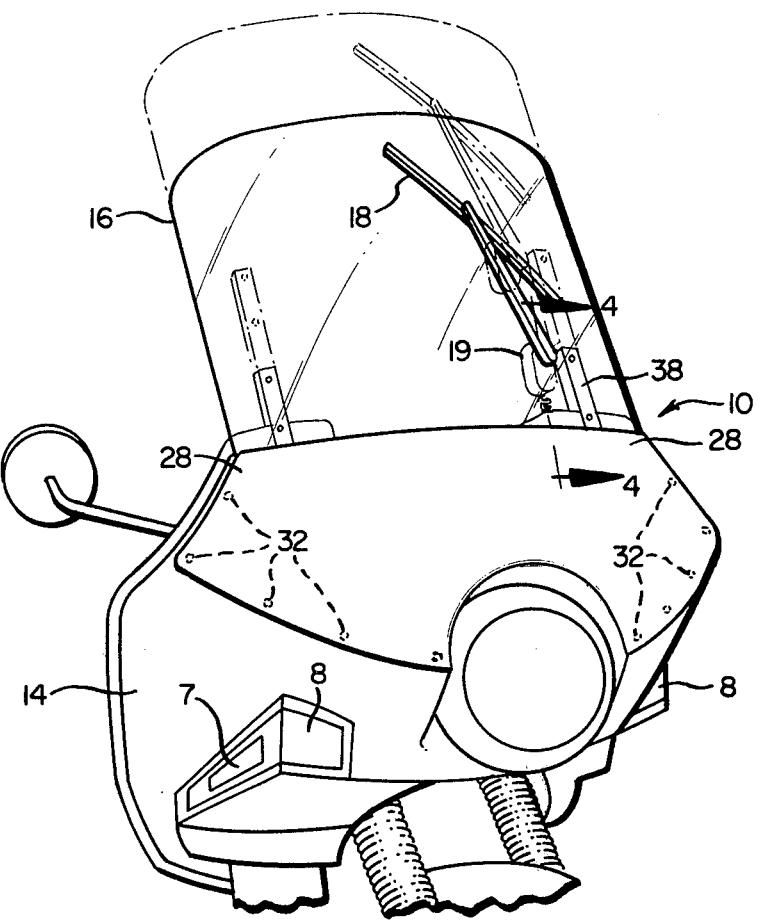
FIG. 1 shows a fragmentary, perspective view of the windscreen of the present invention attached to a motorcycle fairing with the windscreen being illustrated in a lowered and raised position.
Figure 2:
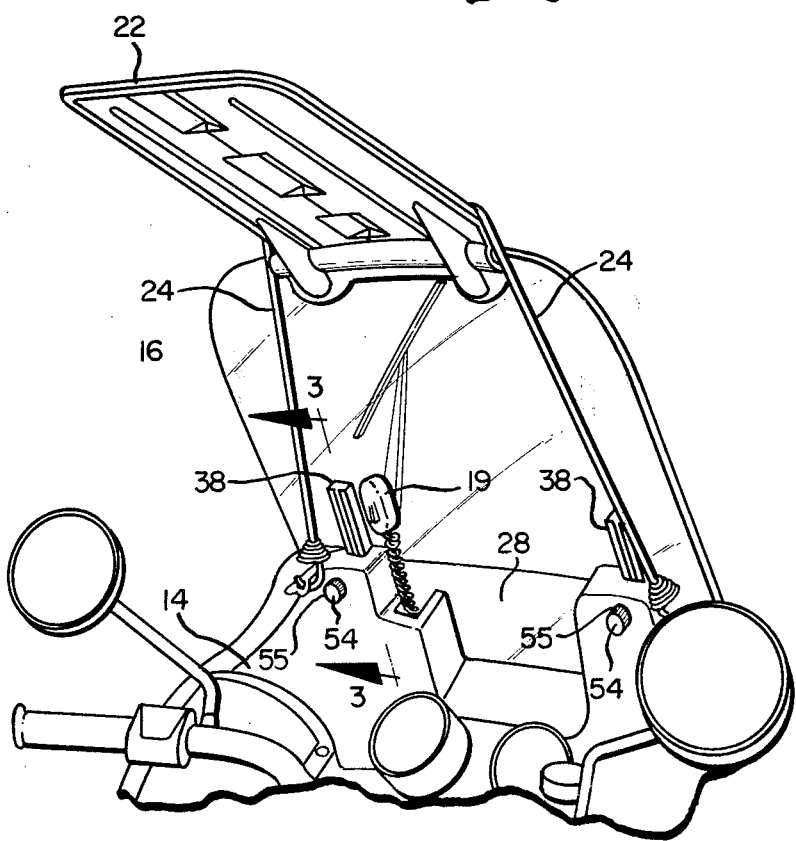
FIG. 2 shows a fragmentary, perspective view of the windscreen of the present invention with a rain-sun shield disposed on the top edge of the windscreen and a wiper motor assembly disposed on the back face of the windscreen.

Referring to the drawings there is shown an enclosure 10 mounted to the front portion of a motorcycle frame. Enclosure 10 includes windscreen 16 and a molded, generally convex fairing 14 having sides and a bottom which taper outwardly and rearwardly thereof in such a manner as to direct winds and the like around the motorcycle and its occupants. Fairing 14 is a type such as described in my earlier U.S. Pat. No. 4,066,291 issued Jan. 3, 1978, and which is incorporated herein by reference.

Windscreen 16, which is optically clear or transparent, extends upwardly from fairing 14 and functions to direct wind and airborne material away from the upper body of the motorcycle rider.

A wiper assembly 18 positioned for clearing windscreen 16 is driven by electrical motor 19 powered by the electrical system of the motorcycle. If desired a washer assembly arrangement, such as described in my U.S. Pat. No. 4,066,291, can be utilized with the windscreen wiper assembly shown and disclosed herein.

A rain-shield 22 can, if desired, be mounted atop windscreen 16. Shield 22 extends rearwardly to provide a protective cover for directing air and rain away from the driver, as well as protecting against the sun. Resilient or elastic hold-down cords 24 hold shield 22 against the upper rim of windscreen 16 in the manner described in my U.S. Pat. No. 4,066,291.

Fairing 14 includes an outer face cover shield or wall member 28 and an inner wall member 30 spaced from the outer face cover or wall member 28. Member 30 can be molded to member 28 or permanently attached thereto. Alternatively, face cover shield member 28 can be attached to member 30 by means of break-away bolts 32 or other suitable snap fasteners not shown.

Windscreen 16 is adapted to be disposed within the space formed by fairing wall members 28 and 30. A pair of spaced female channel-shaped members 38 are fastened to the back face of windscreen 16. Although not shown, it is understood that conventional resilient rubber cushioning means may be disposed between female channel members 38 and the back face of windscreen 16. It is further understood that cushioning means, not shown, may be deployed between the windscreen and all surfaces which might otherwise contact and abrade the windscreen.

The female members 38, which can be extruded and made of a suitable metal or plastic, each are of a length which extends approximately from the lower edge of windscreen 16 as shown in FIG. 3 upward for a substantial portion of the height of windscreen 16. Each member 38 comprises a bottom wall 40, a pair of spaced side walls 41 extending outward from wall 40 and top walls 42 extending inwardly from the side walls 41.

A plurality of threaded openings 43 are located in the bottom wall 40 of female member 38. Flat headed windscreen screws 44 and 45 serve to fixedly attach female member 38 to the back face of windscreen 16 and plug all holes in the windscreen. Flat headed windscreen screw 45 is elongated and extends well into the hollow channel created by female member 38 to serve as a stop means. Extrusion 38, when mounted to the windscreen 16 with flat head screws 44 and 45 preclude any protuberances on the front windscreen face which would interfere with normal wiper use.

A male track member 46 having a raised bottom wall 47 and spaced side walls 48 is fixedly attached to fairing wall member 30. The male member can be extruded, if desired, and made of any suitable metal or plastic. As shown in FIGS. 5 and 6, the bottom wall 47 of member 46 is provided with a raised section 49 which serves to space wall 47 from fairing member 30 in order that top walls 42 of female member 38 can be seated between fairing member 30 and male member bottom wall 47.

A plurality of openings 50 are located in the bottom wall 47 of male member 46 and suitable screws 51 of either permanent or break-away types can be utilized to fixedly attach male member 46 to fairing wall 30. The break-away screw types, which are presently available in the prior art, are the preferred embodiment for upper screws 51.

As shown more clearly in FIGS. 5 and 6, upon assembly, female member 38 is adapted to be disposed on and travel along the length of male member 46. When the windscreen is fully raised, elongated flat headed screw 45 shown in FIG. 3 contacts screw 51 shown in FIGS. 3 and 6. Contact between screws 51 and 45 serves as a stop means in that the continued upward movement of windscreen 16 is prevented. Thus, windscreen 16 cannot be removed from the fairing housing thereby serving to reduce the theft of the windscreen. Lowermost screw 51 shown on FIG. 3 also serves as a stop to screw 45 and keeps the windscreen from being lowered beyond a desired level.

Mechanism 54, shown in FIGS. 5 and 6, serves as a releasable windscreen adjusting device. The mechanism also permits the disengagement of the collectively interlocked male extrusion member 46, female extrusion member 38, and windscreen 16 from fairing wall member 30 upon rider impact against the windscreen during an accident. Permitting the windscreen assembly to break-free upon impact obviates the chance of rider impalement on a shattered, fixed windscreen. For extended threaded life and freedom from corrosive binding, a conventional permanently anchored stainless steel nut 60 is pressed and locked into male extrusion wall 47. Hardened, corrosion protected steel set screw 61 is threaded and extends through and beyond nut 60 and bears against inner bottom wall surface 59 of female member wall 40. When set screw 61 is pressed against wall surface 59, movement of female extrusion 38 and connected windscreen 16 is prevented because top walls 42 of member 38 are seated against bottom wall 47 of male member 46. Set screw 61 is adjusted by inserting a hex wrench tip 62 into its hex socket head. Hex tip 62 located on screw shaft 65 serves as the hex wrench. Scrw shaft 65 with knob 55 is affixed to fairing 14 by a blind, compression locked fastener 33. The thread pitch on fastener nut 33, shaft 65, and set screw 61 preferably are about the same to preclude unwanted withdrawal of hex tip 62 from set screw 61 during ordinary use of the adjusting mechanism. Washer 63 with pin 64 through shaft 65 serves to limit the distance shaft 65 can be backed out of fastener 33 thereby preventing the removal of shaft 65 from set screw 61 and removal of set screw 61 per se from nut 60 during ordinary release and adjustment of windscreen 16. A fairing access hole for installation of washer 63 and stop pin 64 is not shown. In the event of severe impact, set screw 61 is driven forward with member 38. Screw 61 is separated from hex tip 62 of screw shaft 65 which is attached to fairing 14.

The releasable adjusting mechanism of the present invention does not impose cyclical, high pressure loads on plastic fairing shell 14, which could cause plastic stress cracks and failure. Instead, cyclical, high pressure loads are applied to components capable of withstanding them. The components capable of withstanding this type of loading are female extrusion 38, male extrusion 46, set screw 61 and nut 60 which are made of metal or other suitable material.

The use of the extruded female members serves to stiffen the windscreen member particularly when the windscreen is in a raised, extended positon as compared to prior art windscreens. The cross-section of the structural track members 38 and 46 can be sized and shaped to withstand the applicable forces that may act upon the windscreen.

It is appreciated that while a threaded locking means 54 has been shown, a spring biased locking means adapted to be inserted in detents located in the bottom wall 59 of female member 38 could be utilized, if desired.

Similarly, while track and channel-shaped members have been shown, it is appreciated that other slidably engaged structural arrangements could be employed. For example, telescoping sections could be employed to serve in place of the channel-shaped members. Further, it is understood one of the two slidably engaged structural members could be attached to the motorcycle per se instead of the fairing.

Wiper motor 19 has been shown attached directly to the back face of windscreen 16 so that it can be raised and lowered with windscreen 16. If desired, an expanding and contracting spiral wound electrical cord 70 can be employed for connecting wiper motor 19 to the electrical system of the motorcycle. The spiral wound cord 70 can collapse into the recess 71 formed on the top surface of the fairing shell 14.

When dark, a rider will sometimes bank the motorcycle into a tight turn at a dark intersection such that obstructions, curbs and pot-holes are hard to see. Cornering lights 7, only one of which is shown in FIG. 1, can be activated by turn signals thereby permitting a rider to see these hazards more clearly. Right cornering light 7, FIG. 1, is located in a sideways facing, fore and aft plane as opposed to the forward facing, transverse plane of turning signal light structure 8. A left cornering light, not shown, is similarly disposed in a sideways facing, fore and aft plane on the left side of the fairing.

Figure 7:
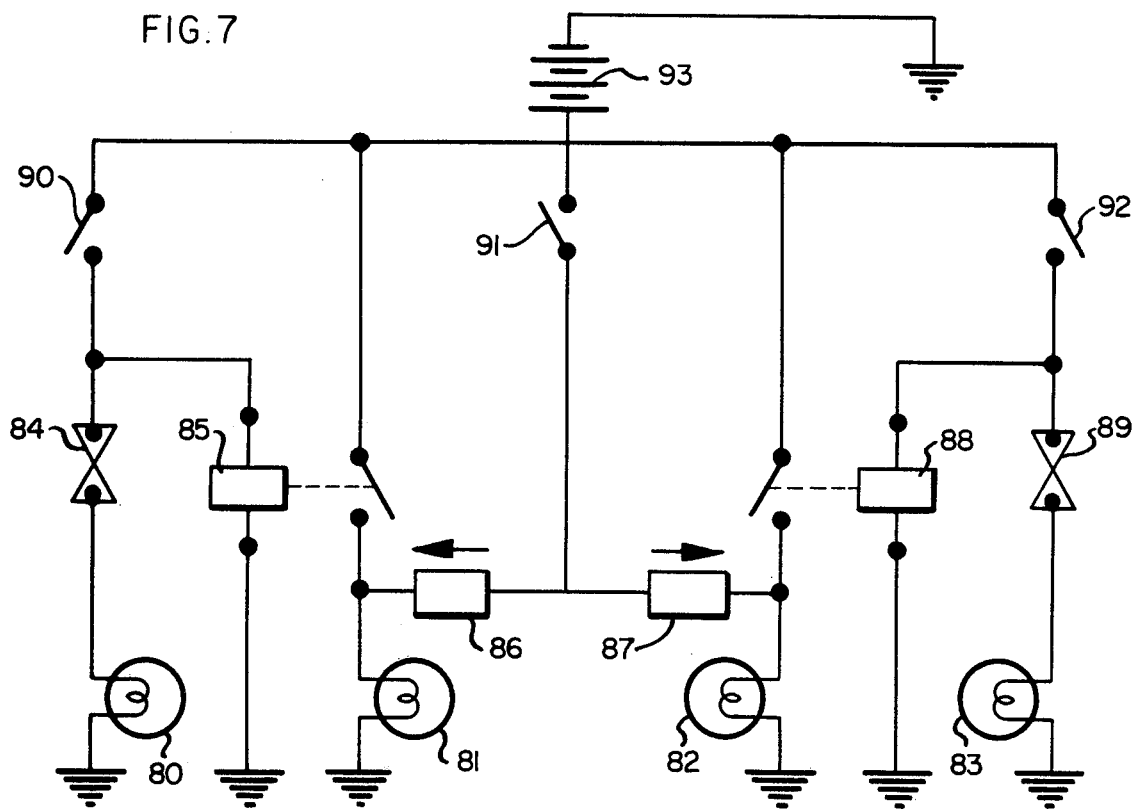
FIG. 7 shows a wiring diagram for the cornering lights.

In FIG. 7, numeral 81 corresponds to the left side cornering light 7 in FIG. 1 while numeral 82 corresponds to the right side cornering light 7. Cornering lights 81 and 82, FIG. 7, are operated either by motorcycle turn signal switches 90 and 92 or manual switch 91. In retrofit applications on existing motorcycles, as shown in FIG. 7, the motorcycle's electrical wiring must be tapped between, for example, left turn signal switch 90 and flasher 84. To draw minimum current from current-dependent flasher 84 relay 85 must have substantial electrical resistance. Operation of turn signal switch 90 closes relay 85 and turns on cornering light 81. When turn signal 90 self-cancels, relay 85 opens and cornering light 81 is deactivated. While the left turn signal was chosen for explanation, it is apparent the right turn signal and cornering light operate in an identical manner.

When required for safe driving, both cornering lights 81 and 82 may be permanently turned on with manual switch 91 of FIG. 7. As shown in FIG. 7, one-way current chokes 86 and 87 allow the passage of current through switch 91 to cornering lights 81 and 82; however, choke 87 prevents current from reaching left cornering light 81 when right turn signal switch 92 closes. Correspondingly, one-way current choke 86 prevents current from reaching right cornering light 82 when left turn signal switch 90 closes.

Figure 8:
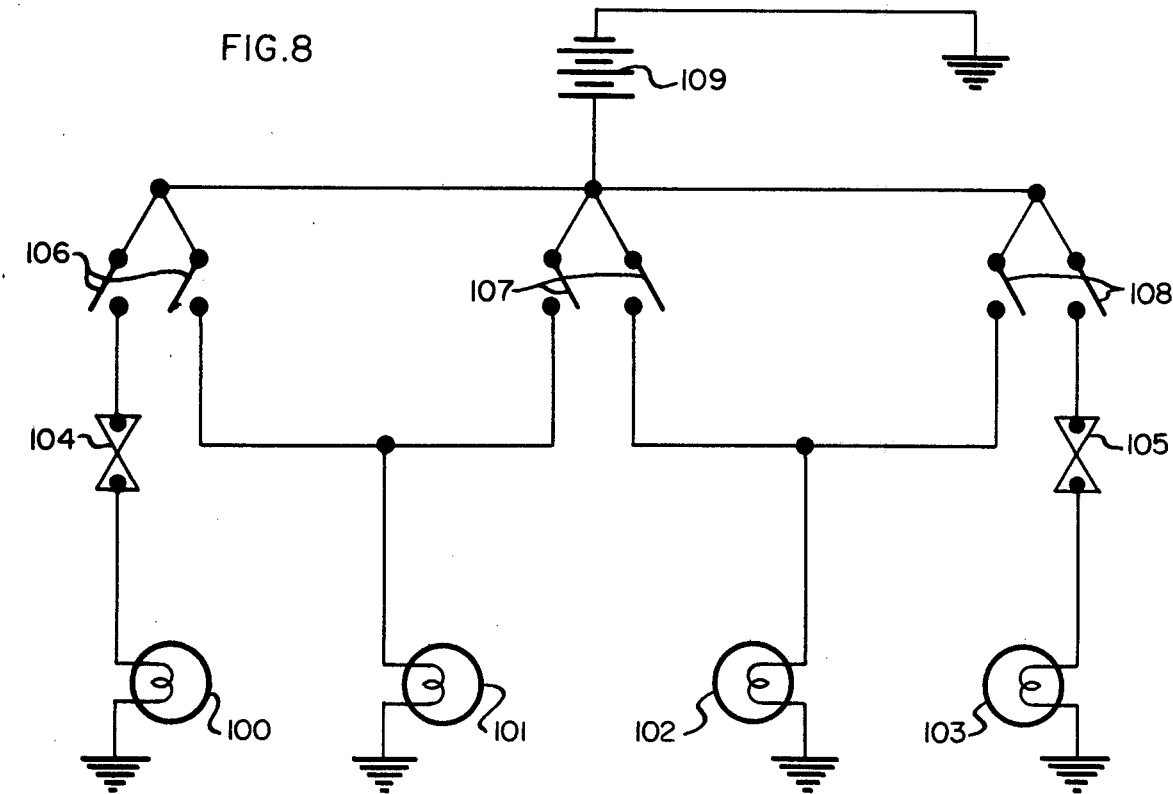
FIG. 8 shows an optional wiring diagram for the cornering lights of the present invention.

Comparing FIG. 8 with FIG. 7, relays 85 and 86 of FIG. 7 can be eliminated when 4-pole turn signal switches 106 and 107, shown on FIG. 8, are used. Further, one-way current chokes 86 and 87 shown on FIG. 7 need not be employed. Instead a 3 or 4-pole manual switch 107 can be used in lieu of the 2-pole manual switch shown in FIG. 7.

The foregoing detailed description has been given for clearness of understanding only and no unnecessary limitations should be understood therefrom, as modifications will be obvious to those skilled in the art.

What is claimed is:

1. A translatably adjustable windscreen assembly adapted for use with a motorcycle fairing, said windscreen assembly comprising:
   a generally vertical, transparent member which is adapted to be adjacent to the fairing;
   means for releasably fastening the windscreen and adjustably positioning the windscreen by translating the entire windscreen up and down relative to the fairing; and,
   a windscreen wiper assembly, including an electrical wiper motor means, wiper arm and blade, and electrical connecting means between said wiper motor and the electrical system of a motor vehicle, said assembly being mounted directly on said adjustable windscreen and including means for allowing said motor assembly to be movable with said windscreen whereby said wiper motor assembly can be raised or lowered with the adjustable windscreen.

2. A windscreen assembly in accordance with claim 1 and further including stop means for preventing the windscreen from being raised beyond a desired upper limit.

3. A windscreen assembly in accordance with claim 1 and further including stop means for preventing the windscreen from being lowered beyond said desired lower limit.

4. A windscreen assembly in accordance with claim 1 wherein said windscreen is free of any open apertures.

5. A windscreen assembly in accordance with claim 1 and further including windscreen break-away means whereby said windscreen is adapted to break away from said fairing.

6. A windscreen assembly in accordance with claim 5 and further including shield means maintained in position with break-away fastener means to further permit said windscreen to break away from said fairing.

7. A windscreen assembly in accordance with claim 1 and further including shield means adapted to be located adjacent the front face of said windscreen to extend below the lower edge of said windscreen for precluding water from entering under the lower windscreen edge to the operator area.

* * * * *

UNITED STATES PATENT AND TRADEMARK OFFICE
CERTIFICATE OF CORRECTION

PATENT NO. : 4,355,838

DATED : October 26, 1982

INVENTOR(S) : John S. Hickman

It is certified that error appears in the above-identified patent and that said Letters Patent are hereby corrected as shown below:

Col. 1, line 56, "portion" should be --position--;

Col. 5, line 39, "threaded" should be --thread--;

Col. 5, line 52, "Scrw" should be --Screw--;

Signed and Sealed this

Twenty-fourth Day of May 1983

[SEAL]

Attest:

DONALD J. QUIGG

Attesting Officer   Acting Commissioner of Patents and Trademarks